UNITED STATES PATENT OFFICE.

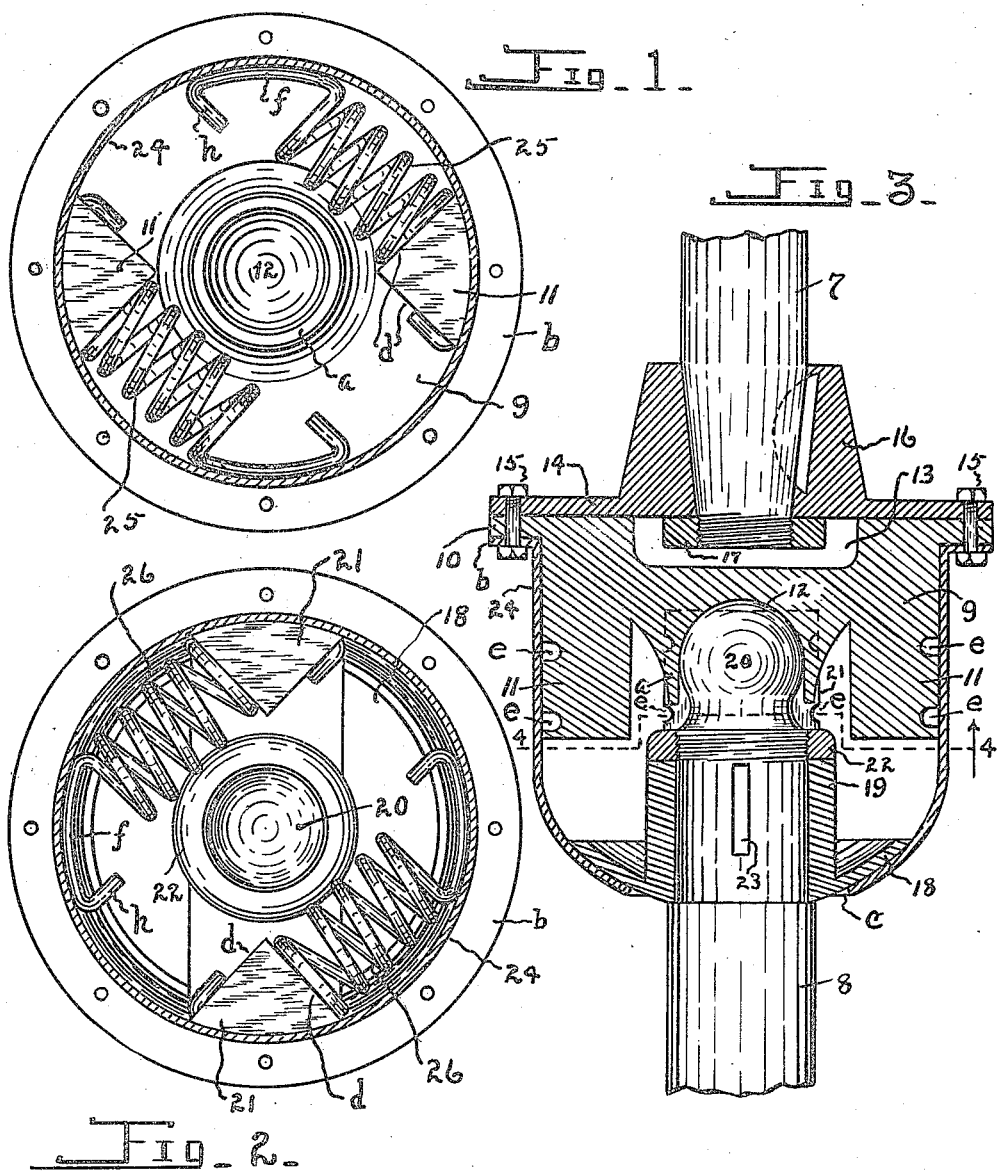

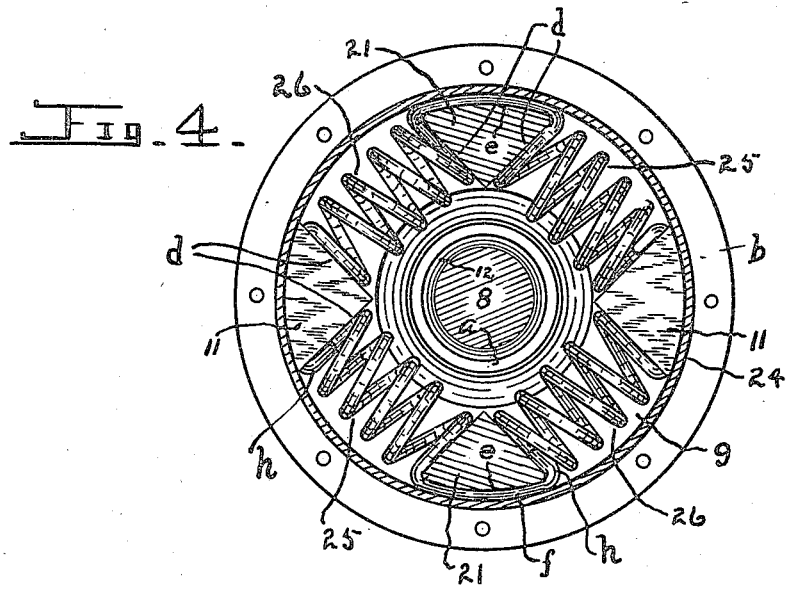
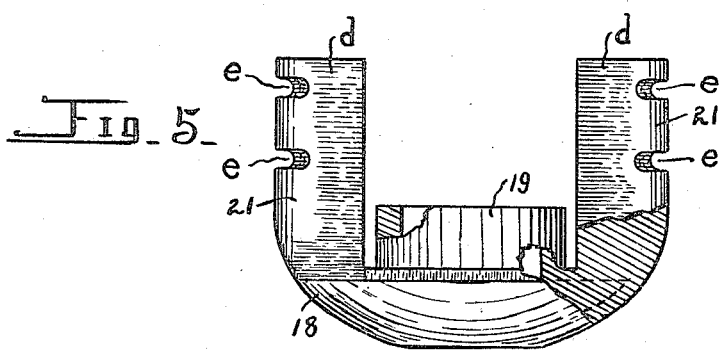
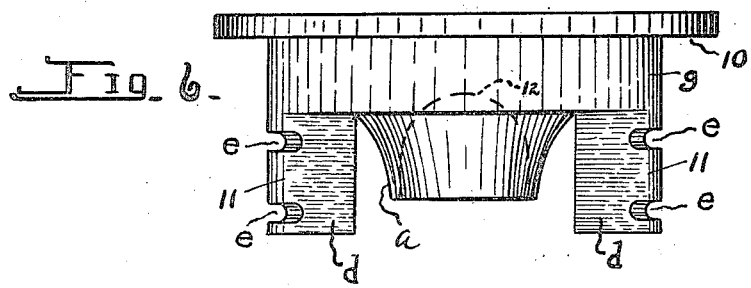

WILLIAM C. MORTON, OF OMAHA, NEBRASKA, ASSIGNOR OF ONE-THIRD TO JOSEPH P. CONDON AND ONE-THIRD TO IRA O. MORTON, BOTH OF OMAHA, NEBRASKA.

UNIVERSAL JOINT.

1,423,577. Specification of Letters Patent. Patented July 25, 1922.

Application filed May 24, 1920. Serial No. 383,915.

*To all whom it may concern:*

Be it known that I, WILLIAM C. MORTON, a citizen of the United States, residing at Omaha, in the county of Douglas and State of Nebraska, have invented certain new and useful Improvements in a Universal Joint, of which the following is a specification.

This invention relates to a universal joint or shock absorber for communicating motion from a revoluble shaft to a driven shaft, and particularly useful in connection with motor vehicles.

One of the objects in view is to provide such a connection or coupling that the conventional wheels may be dispensed with, to eliminate breakage of gear teeth. Another object is to eliminate undue friction and wear of parts, and a further object is to prevent the undue jolting, shocks or vibration of a driven shaft when a revoluble movement is communicated thereto by a rotatable shaft.

With the foregoing objects in view, and others to be mentioned hereinafter, the invention presents a novel construction, combination and arrangement of parts as described herein and claimed, and as illustrated in the accompanying drawing, wherein,—

Fig. 1 is a view of the inner end of a bearing-block, a casing in section and a pair of springs also being shown. Fig. 2 is a view of the inner end of a holder-block for a driven shaft, a casing in section and a pair of springs being added. Fig. 3 is a view of two connected shafts, the blocks being in section. Fig. 4 is a view in transverse section through the casing and bearing-block on line 4—4 of Fig. 3. Fig. 5 is a side view, partly in section, of the holder-block. Fig. 6 is a side view of the bearing-block.

The invention is illustrated in connection with a revoluble shaft 7 and a driven shaft 8, and in order that the objects first mentioned may be attained, I provide a cylindrical casting or bearing-block 9, preferably provided at its outer end with a circular flange 10 and having a pair of opposed projections or arms 11 extending inwardly, said block also being provided at its inner end with an annular wall $a$ and a bowl-shaped recess 12 disposed in line with the longitudinal axis and opening upon the inner end of said block. Numeral 13 (Fig. 3) indicates a recess opening upon the outer end of the block 9, and at 14 is indicated a disc adapted to be secured to the flange by bolts 15 or equivalent means, said disc being provided with a collar 16 for receiving the shaft 7 which is suitably keyed thereto, the inner end of said shaft preferably projecting within the recess 13, and secured by a nut 17.

I provide a holder-block 18 approximately of saucer-shape, provided at its middle with an inwardly projecting sleeve 19 for receiving the shaft 8, said shaft being provided with a ball-shaped head 20 adapted to make contact with the wall of the recess 12, said block 18 also being provided with a pair of opposed, inwardly extending projections or arms 21. Numeral 22 indicates a nut adapted to be threaded on the shaft 8 near the junction of said shaft with its head 20, to bear upon the end of the sleeve 19 for preventing any end thrust of the last named shaft with reference to the block or casting 18; and numeral 23 indicates a slot which is formed in the sleeve 8 for receiving a key (not shown) for securing said shaft to the casting 18.

At 24 is indicated a casing for containing the castings 9 and 18, said casing having its inner end provided with a circular flange $b$ for engaging the flange 10, its outer end being of concavo-convexed form and provided with an aperture $c$ having a greater area than the area of the shaft in cross-section, to permit said shaft to be disposed in non-alignment with the shaft 7, when required.

In order that stresses directed to the shaft 7 may be communicated to the shaft 8 without undue shocks or vibration, and that undue friction may be avoided, and that the parts will be durable, and also that wheels and gear teeth may be dispensed with, I provide a plurality of springs, these being disposed opposite to each other in pairs, as the springs 25 and 26. Each projection or arm 11 and 21 is preferably formed with a pair of facets $d$, these being disposed in planes approximately at right-angles to each other to provide suitable supports for the springs, each arm preferably being provided with a pair of grooves $e$ opening on its convexed side for receiving the extension $f$ of a spring 25 and the extension $f$ of a spring 26.

Each spring 25 and 26 is so disposed that it abuts upon a facet of a projection 11 and upon a facet of a projection 21 opposite to and parallel therewith, and is secured at its respective ends to an arm or projection by means of a terminal hook $h$ in engagement with a facet, and therefore the springs operate unitedly to resist stresses, and on account of this construction, stresses directed to one of the shafts will be communicated to the other shaft without appreciable shocks or vibration.

While the shaft 8 has been indicated specifically as the one to be rotated by the revoluble movements of the shaft 7, this has been for convenience of description, and it will be understood that either shaft may be revoluble in either direction for communicating a revoluble movement to the other shaft. Also, while I have described construction in detail, I do not wish to be understood as limiting myself in this respect, and changes in size, proportion and minor details may be made as found to be of advantage, said changes to be determined by the scope of the invention as claimed.

What I claim as new and desire to secure by Letters Patent is—

A universal joint for drive and driven shafts, comprising a spherical head on the end of one shaft, a sleeve fitted over said shaft inwardly of the head and having cooperating means on the shaft to prevent end thrust thereof in either direction, said sleeve having a saucer-like flange and arms extending from the sleeve in a direction substantially parallel with the axis of both shafts and having facets disposed at substantially right angles and with rounded outer surfaces, provided with spaced notches therein, a block composed having a cylindrical portion with an inner annular wall extending about the spherical head and provided with a socket within the wall conforming and turning relatively to the head, said block having arms lying outwardly of the annular wall and extending between the first mentioned arms, said latter arms also having right angularly disposed facets parallel with opposed facets of the first mentioned arms and being further formed with substantially rounded outer surfaces having notches therein, coil springs lying between the arms and having their ends engaged upon opposed facets, said springs having hooks extending into the notches of the respective arms, said block having a flange projecting outwardly at its edge portion, a disc fitting against the rear portion of the block and secured to said flange and provided with a sleeve fitted over the other shaft and secured to turn therewith, and a casing having a cylindrical portion fitting about said arms and upon the rounded surfaces thereof, and having a flange secured against the flange on said block, said casing also formed with a rounded end portion bearing against the saucer like flange, and having an opening to receive the shaft.

In testimony whereof, I have affixed my signature in presence of two witnesses.

WILLIAM C. MORTON.

Witnesses:
HIRAM A. STURGES,
ALBERT T. BROWN.